United States Patent
Kim et al.

(10) Patent No.: US 12,188,166 B2
(45) Date of Patent: Jan. 7, 2025

(54) SERVER, WASHING MACHINE AND WASHING SYSTEM HAVING THEREOF

(71) Applicant: Samsung Electronics Co., Ltd., Suwon-si (KR)

(72) Inventors: Kyungjae Kim, Suwon-si (KR); Jooyoo Kim, Suwon-si (KR); Hyungseon Song, Suwon-si (KR); Chanhyung Kong, Suwon-si (KR); Miyoung Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/733,349

(22) Filed: Apr. 29, 2022

(65) Prior Publication Data

US 2022/0259788 A1    Aug. 18, 2022

Related U.S. Application Data

(63) Continuation of application No. PCT/KR2021/016120, filed on Nov. 8, 2021.

(30) Foreign Application Priority Data

Jan. 14, 2021  (KR) .......................... 10-2021-0005575

(51) Int. Cl.
*D06F 34/04*  (2020.01)
*D06F 34/06*  (2020.01)
(Continued)

(52) U.S. Cl.
CPC .............. *D06F 34/04* (2020.02); *D06F 34/06* (2020.02); *D06F 34/22* (2020.02); *G05B 13/027* (2013.01);
(Continued)

(58) Field of Classification Search
CPC ................. D06F 34/22; D06F 2103/20; A47L 15/00–508
See application file for complete search history.

(56) References Cited

U.S. PATENT DOCUMENTS 5,241,845 A    9/1993  Ishibashi et al.
11,149,376 B2  10/2021  Cha et al.
(Continued)

FOREIGN PATENT DOCUMENTS

CN    108755001 A    11/2018
CN    110295475 A    10/2019
(Continued)

OTHER PUBLICATIONS

KR950007846B1 Machine Translation (Year: 1995).*
International Search Report and written opinion dated Feb. 21, 2022, issued in International Application No. PCT/KR2021/016120.

*Primary Examiner* — Spencer E. Bell
(74) *Attorney, Agent, or Firm* — Jefferson IP Law, LLP

(57) ABSTRACT

A server, a washing machine, and a washing system including the same are provided. The washing system includes a washing machine and a server configured to receive turbidity information of washing water from the washing machine at pre-set time intervals, identify an amount of change in turbidity information of the washing water for the pre-set time intervals based on the received turbidity information, predict turbidity information of the washing water based on the amount of change in turbidity information of the washing water, and transmit a control signal for controlling a washing cycle of the washing machine based on the predicted turbidity information of the washing water.

8 Claims, 17 Drawing Sheets

(51) Int. Cl.
  *D06F 34/22* (2020.01)
  *D06F 103/20* (2020.01)
  *D06F 105/42* (2020.01)
  *D06F 105/52* (2020.01)
  *D06F 105/56* (2020.01)
  *G05B 13/02* (2006.01)

(52) U.S. Cl.
  CPC ...... *D06F 2103/20* (2020.02); *D06F 2105/42* (2020.02); *D06F 2105/52* (2020.02); *D06F 2105/56* (2020.02)

(56) References Cited

U.S. PATENT DOCUMENTS

| | | | |
|---|---|---|---|
| 2003/0106164 A1* | 6/2003 | Metzger-Groom | ........................ A47L 15/4297 8/158 |
| 2012/0090099 A1* | 4/2012 | Kim | ........................ D06F 33/36 8/137 |
| 2020/0002868 A1 | 1/2020 | Yang | |
| 2020/0018010 A1 | 1/2020 | Cha et al. | |
| 2020/0063323 A1 | 2/2020 | Kessler et al. | |
| 2020/0141040 A1 | 5/2020 | Cha et al. | |
| 2020/0362497 A1 | 11/2020 | Park et al. | |
| 2021/0207304 A1* | 7/2021 | Kim | ........................ D06F 39/00 |
| 2022/0287540 A1* | 9/2022 | Rupp | .................. A47L 15/0063 |

FOREIGN PATENT DOCUMENTS

| | | | |
|---|---|---|---|
| CN | 111926526 A | | 11/2020 |
| JP | 04-276295 A | | 10/1992 |
| KR | 950007846 B1 | * | 7/1995 |
| KR | 10-1995-0032821 A | | 12/1995 |
| KR | 10-2019-0081856 A | | 7/2019 |
| KR | 10-2019-0082695 A | | 7/2019 |
| KR | 10-2019-0104480 A | | 9/2019 |
| KR | 10-2019-0107619 A | | 9/2019 |
| KR | 10-2019-0107624 A | | 9/2019 |

* cited by examiner

FIG. 5D

| DEGREE OF CONTAMINATION | CONDITION | WASHING TIME | AMOUNT OF DETERGENT PUT IN | NUMBER OF RINSES |
|---|---|---|---|---|
| RISING (LIGHT) | 100 < k | -5 MINUTES | -2.5ml | -1 |
|  | 50 < k ≤ 100 | -2 MINUTES | -1ml | -1 |
| MAINTAINING (NORMAL) | -50 < k ≤ 50 | NO CHANGE | NO CHANGE | NO CHANGE |
| DESCENDING (HEAVY) | -100 < k ≤ -50 | +3 MINUTES | +1.5ml | +1 |
|  | -150 < k ≤ -100 | +6 MINUTES | +3ml | +1 |
|  | k ≤ -150 | +10 MINUTES | +5ml | +2 |

SERVER, WASHING MACHINE AND WASHING SYSTEM HAVING THEREOF

CROSS-REFERENCE TO RELATED APPLICATION(S)

This application is a continuation application, claiming priority under § 365(c), of an International application No. PCT/KR2021/016120, filed on Nov. 8, 2021, which is based on and claims the benefit of a Korean patent application number 10-2021-0005575, filed on Jan. 14, 2021, in the Korean Intellectual Property Office, the disclosures of which is incorporated by reference herein in its entirety.

BACKGROUND

1. Field

The disclosure relates to a robot including a plurality of sensors. More particularly, the disclosure relates to a system including a robot and a user terminal, and a controlling method thereof.

2. Description of the Related Art

Washing machines of the related art operated by determining, based on a washing command being input, a washing cycle including washing time, an amount of detergent put in, or number of rinses based on a weight of the laundry placed into the washing machine.

However, when a washing cycle is determined simply based on the weight of the laundry, characteristics of the laundry may not be reflected and the washing time, amount of detergent put in, the number of rinses, or the like may be unnecessarily increased, or a problem of completing the wash while in a state in which the laundry is not sufficiently washed.

In an example, there have been problems such as when laundry of a low degree of contamination is put in by a threshold weight or more, the washing machine of the related art increased the washing time, the amount of detergent put in, or the number of rinses unnecessarily for the reason that the weight of the laundry is a threshold weight or more, and when laundry of a high degree of contamination is put in by less than a threshold weight, the washing machine of the related art performed washing for a short period of time or with less amount of detergent for the reason that the weight of the laundry is less than a threshold weight.

SUMMARY

Aspects of the disclosure are to address at least the above-mentioned problems and/or disadvantages and to provide at least the advantages described below. Accordingly, an aspect of the disclosure is to provide a server configured to control a washing cycle of a washing machine based on turbidity information of washing water obtained while performing washing, a washing machine configured to perform a washing cycle according to the control of the server and a washing system having thereof.

In accordance with an aspect of the disclosure, a server is provided. The server includes a communicator, and a processor configured to receive turbidity information of washing water from a washing machine at pre-set time intervals through the communicator, identify an amount of change in turbidity information of the washing water for the respective pre-set time intervals based on the received turbidity information, predict turbidity information of the washing water based on an amount of change in turbidity information of the washing water, and transmit a control signal for controlling a washing cycle of the washing machine based on the predicted turbidity information of the washing water to the washing machine through the communicator.

The processor may be configured to identify a turbidity pattern of the washing water based on a most recently received turbidity information from among the received turbidity information or the predicted turbidity information of the washing water, and transmit the control signal to the washing machine through the communicator based on the turbidity pattern of the washing machine.

The processor may be configured to transmit, based on the turbidity pattern of the washing water, the control signal for controlling at least one of a washing time, an amount of detergent put in, or a number of rinses to the washing machine through the communicator.

The processor may be configured to transmit, based on a turbidity pattern of the washing water being a rising pattern, the control signal for reducing at least one of the washing time, the amount of detergent put in, or the number of rinses of the washing machine to the washing machine through the communicator, and transmit, based on the turbidity pattern of the washing water being a descending pattern, the control signal for increasing at least one of the washing time, the amount of detergent put in, or the number of rinses of the washing machine to the washing machine through the communicator.

The processor may be configured to transmit, based on the turbidity pattern of the washing water being a rising pattern, and a difference between the most recent turbidity information of the washing water and the predicted turbidity information of the washing water being greater than or equal to a first threshold value, at least one of a signal for reducing the washing time of the washing machine by a first time, a signal for reducing the amount of detergent put in by a first quantity, or a signal for reducing the number of rinses by a first number of times to the washing machine through the communicator, and transmit, based on the turbidity pattern of the washing water being a rising pattern, and a difference between the most recent turbidity information of the washing water and the predicted turbidity information of the washing water being greater than or equal to a second threshold value which is higher than the first threshold value, at least one of a signal for reducing the washing time of the washing machine by a second time which is longer than the first time, a signal for reducing the amount of detergent put in by a second quantity which is smaller than the first quantity, or a signal for reducing the number of rinses by a second number of times which is smaller than the first number of times to the washing machine through the communicator.

The processor may be configured to transmit, based on the turbidity pattern of the washing water being a descending pattern, and a difference between the most recent turbidity information of the washing water and the predicted turbidity information of the washing water being greater than or equal to a third threshold value, at least one of a signal for increasing the washing time of the washing machine by a third time, a signal for increasing the amount of detergent put in by a third quantity, or a signal for increasing the number of rinses by a third number of times to the washing machine through the communicator, and transmit, based on the turbidity pattern of the washing water being a descending pattern, and a difference between the most recent turbidity information of the washing water and the predicted turbidity information of the washing water being greater than or equal to a fourth threshold value which is higher than the third threshold value, at least one of a signal for increasing the washing time of the washing machine by a fourth time which is longer than the third time, a signal for increasing the amount of detergent put in by a fourth quantity which is greater than the third quantity, or a signal for increasing the number of rinses by a fourth number of times which is greater than the third number of times to the washing machine through the communicator.

The processor is configured to receive turbidity information of washing water from the washing machine at the pre-set time intervals for a defaulted time section through the communicator, identify an amount of change in turbidity information of the washing water for the respective pre-set time intervals for the defaulted time section based on the received turbidity information, and predict the turbidity information of the washing water from the defaulted time section to after the pre-set time.

The server of the disclosure may further include a memory configured to store a neural network model, and the neural network model may be a model configured to identify an amount of change in turbidity information of the washing water for the respective pre-set time intervals using the turbidity information of the washing water generated by at least one washing machine at the pre-set time intervals as input data, and may be trained to predict the turbidity information of the washing water based on an amount of change in turbidity information of the washing water, and the processor may be configured to input, based on turbidity information of washing water being received from the washing machine at the pre-set time intervals for the defaulted time section, the received turbidity information of the washing water to the neural network model, and obtain turbidity information of the washing water from the defaulted time section to after the pre-set time as an output data of the neural network model.

The neural network model may be a model configured to identify the amount of change in turbidity information of the washing water for the respective pre-set time intervals using washing information which includes turbidity information of the washing water generated by the at least one washing machine at the pre-set time intervals, a washing course set in the at least one washing machine, a weight of a laundry, and a temperature of the washing water as input data, and trained to predict turbidity information of the washing water corresponding to the washing information based on the amount of change in turbidity information of the washing water.

The processor may be configured to predict, based on the amount of change in turbidity information of the washing water, time of converging the amount of change in turbidity information of the washing water to within a threshold range, and transmit the control signal for setting the washing time of the washing machine to the predicted time to the washing machine through the communicator.

In accordance with another aspect of the disclosure, a washing machine is provided. The washing machine includes a sensor, a communicator, and a processor configured to control the communicator to transmit turbidity information of washing water measured at pre-set time intervals by the sensor to a server, receive a control signal for controlling a washing cycle based on turbidity information of washing water predicted based on an amount of change in turbidity information of the washing water for the respective pre-set time intervals from the server through the communicator, and perform a washing cycle based on the control signal.

The processor may be configured to receive the control signal based on a turbidity pattern of washing water identified based on a most recently transmitted turbidity information of the transmitted turbidity information and the predicted turbidity information of washing water from the server through the communicator.

The processor may be configured to control, based on the control signal which is based on the turbidity pattern, at least one of a washing time, an amount of detergent put in, or a number of rinses.

The processor may be configured to receive, based on the turbidity pattern of the washing water being a rising pattern, the control signal for reducing at least one of a washing time, an amount of detergent put in, and a number of rinses from the server through the communicator, and receive, based on the turbidity pattern of the washing water being a descending pattern, the control signal for increasing at least one of a washing time, an amount of detergent put in, or a number of rinses from the server through the communicator.

The processor may be configured to receive, based on the turbidity pattern of the washing water being a rising pattern, and a difference between the most recent turbidity information of the washing water and the predicted turbidity information of the washing water being greater than or equal to a first threshold value, at least one of a signal for reducing the washing time by a first time, a signal for reducing the amount of detergent put in by a first quantity, or a signal for reducing the number of rinses by a first number of times from the server through the communicator, and receive, based on the turbidity pattern of the washing water being a rising pattern, and a difference between the most recent turbidity information of the washing water and the predicted turbidity information of the washing water being greater than or equal to a second threshold value which is higher than the first threshold value, at least one of a signal for reducing the washing time by a second time which is longer than the first time, a signal for reducing the amount of detergent put in by a second quantity which is smaller than the first quantity, or a signal for reducing the number of rinses by a second number of times which is smaller than the first number of times from the server through the communicator.

According to the one or more embodiments as described above, the degree of contamination may be removed through an appropriate washing time, amount of detergent, or the number of rinses by controlling the washing cycle based on the turbidity information of the washing water.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5D is a diagram illustrating an embodiment of controlling a washing cycle based on a turbidity pattern of a washing water according to an embodiment of the disclosure;

Throughout the drawings, it should be noted that like reference numbers are used to depict the same or similar elements, features, and structures.

DETAILED DESCRIPTION

Terms used in describing one or more embodiments of the disclosure are general terms that have been selected considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, or may be interpreted based on the overall context of the disclosure and the technical common sense according to the related art.

In addition, in describing the disclosure, in case it is determined that the detailed description of related known technologies may unnecessarily confuse the gist of the disclosure, the detailed description thereof will be abridged or omitted.

Expressions such as "first," "second," "1st," "2nd," or so on used in the disclosure may be used to refer to various elements regardless of order and/or importance, and may be used to distinguish one element from another.

The expression "configured to (or set up to)" used in the disclosure may be used interchangeably with, for example, "suitable for," "having the capacity to," "designed to," "adapted to," "made to," or "capable of" based on circumstance.

In the disclosure, a 'module' or a 'part' may be a configuration which performs at least one function or operation, and may be implemented with a hardware or a software, or through the combination of the hardware and software.

The disclosure will be described in detail below with reference to the accompanying drawings.

Figure 1A:
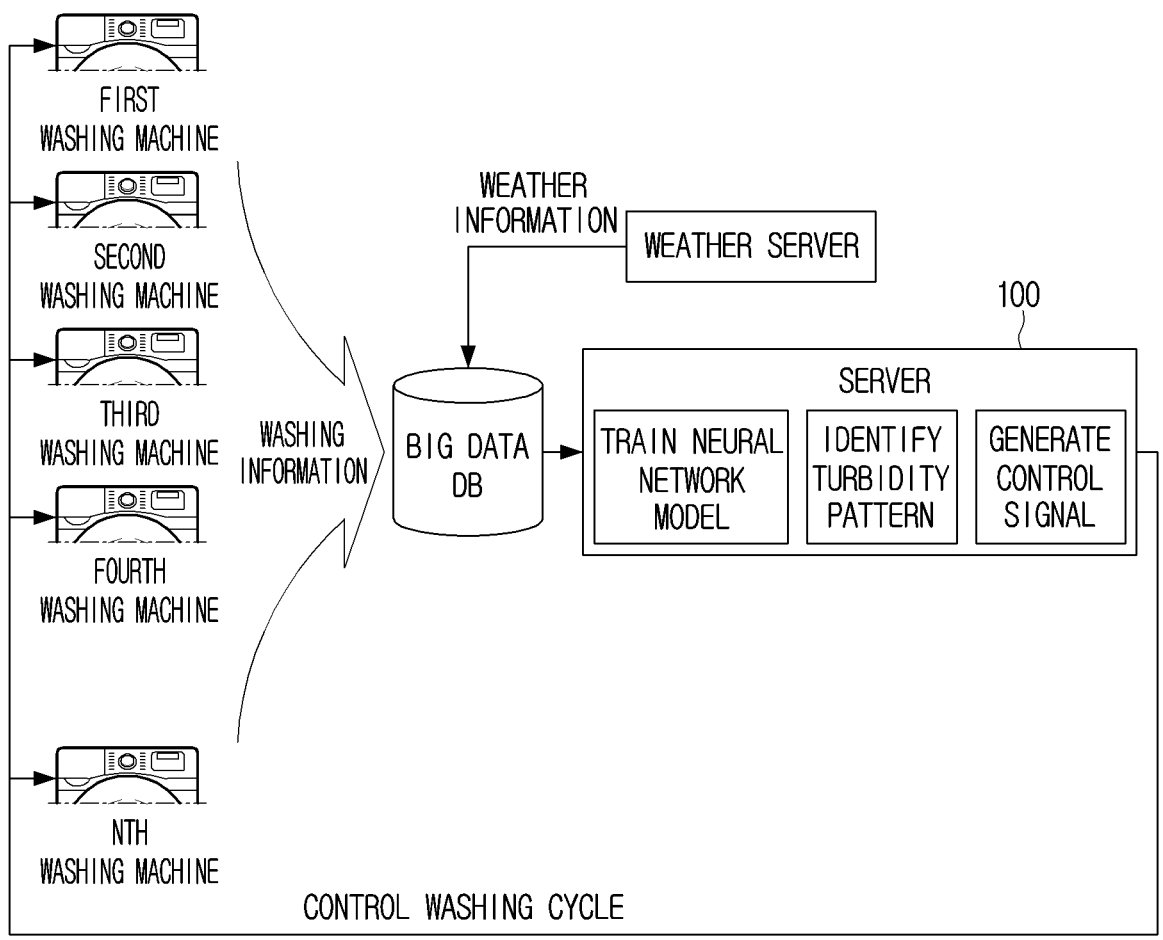
FIG. 1A is a diagram illustrating a washing system according to an embodiment of the disclosure.

FIG. 1A is a diagram illustrating a washing system according to an embodiment of the disclosure.

Referring to FIG. 1A, a washing system 1000 according to an embodiment may include a server 100 and a plurality of washing machines. In addition, the washing system 1000 according to an embodiment may further include a weather server as illustrated in FIG. 1A.

The server 100 may be configured to transmit and receive various data by communicating with the plurality of washing machines. In an example, the server 100 may be configured to receive washing information from the plurality of washing machines. The washing information may include at least one of a washing course set in the washing machine, a weight of laundry, a temperature of a washing water, an amount of detergent put in the washing machine, an operation time of the washing machine, current time, or turbidity information of the washing water.

In addition, the server 100 may be configured to transmit and receive various data by communication with an external server. In an example, the server 100 may be configured receive weather information by communicating with the weather server. The weather information may include at least one of temperature information, humidity information, or fine dust information.

The washing information and/or weather information as described above may be stored in a big data database (DB) of the server 100.

The server 100 may be configured to train a neural network model by inputting the washing information and/or weather information received externally to the neural network model. The neural network model may be configured to identify an amount of change in turbidity information of the washing water for pre-set time intervals using the washing information and/or weather information as input data, and may be trained to predict the turbidity information of the washing water based on the amount of change in the turbidity information of the washing water. Specifically, the neural network model may be configured to identify the amount of change in turbidity information of the washing water based on the turbidity information of the washing water for the respective pre-set time intervals included in the washing information when the washing information and/or weather information is input as input data. Then, the neural network model may train to match the turbidity information of the washing water from a defaulted time to after the pre-set time to the amount of change in turbidity information until the defaulted time.

Then, the server 100 may be configured to input, based on the washing information and/or weather information being received externally, the received washing information and/or weather information to the trained neural network model. In this case, the neural network model may be configured to identify, based on the turbidity information included in the washing information, the amount of change in the turbidity information until the defaulted time, and predict the turbidity information of the washing water from the defaulted time to after the pre-set time through a processing of the neural network model.

Further, the server 100 may be configured to identify a turbidity pattern of the washing water based on the predicted turbidity information of the washing water. The turbidity pattern may be one of a rising pattern, a maintaining pattern, or a descending pattern. The description related to the turbidity pattern will be described below with reference to FIG. 4.

The server 100 may be configured to generate a control signal for controlling a washing cycle based on the turbidity pattern of the washing water, and transmit the control signal to the washing machine. In an example, the processor 120 may be configured to transmit, based on the turbidity pattern of the washing water, the control signal for controlling at least one of the washing time, the amount of detergent put in, or the number of rinses to the washing machine.

Figure 1B:
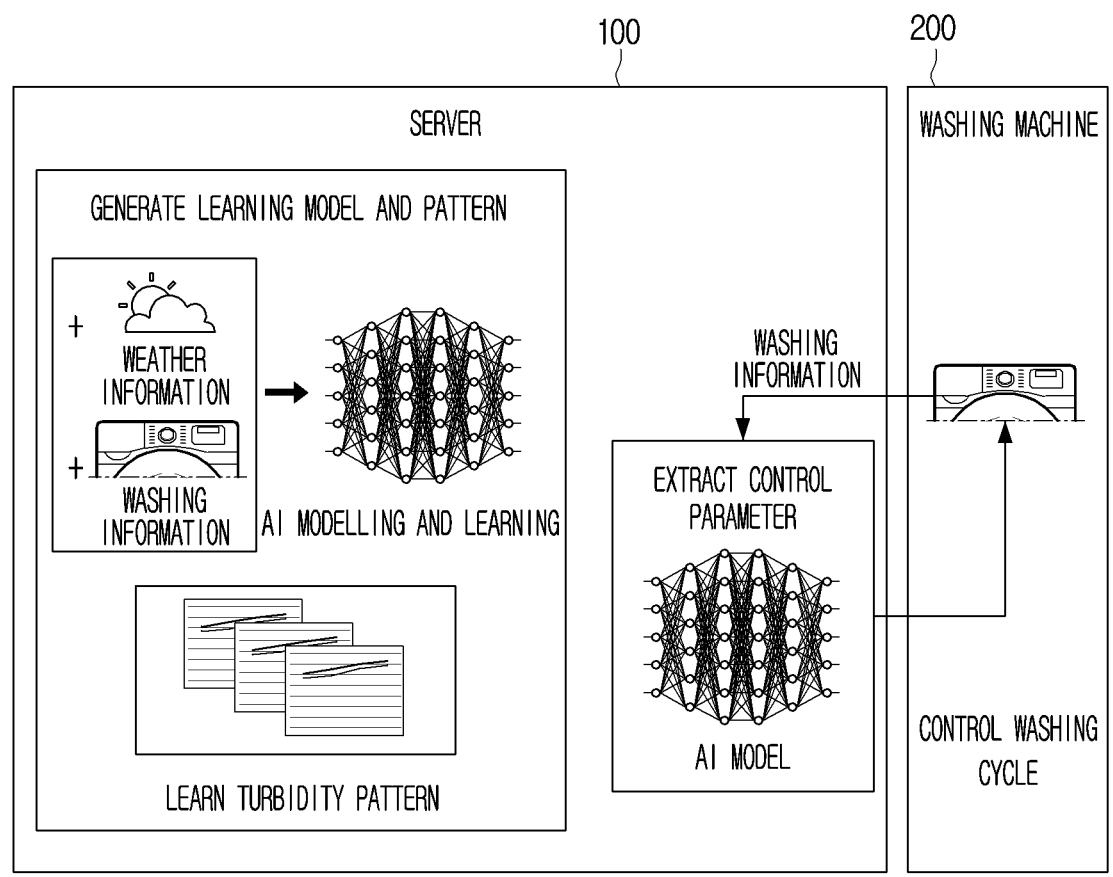
FIG. 1B is a diagram illustrating an embodiment of controlling a washing cycle by using a neural network model stored in a server according to an embodiment of the disclosure.

FIG. 1B is a diagram illustrating an embodiment of controlling a washing cycle by using a neural network model stored in a server according to an embodiment of the disclosure. Referring to FIG. 1B, the neural network model described above may be trained by the server 100 and stored in a memory of the server 100. The server 100 may be configured to extract a parameter for controlling the washing cycle by using the neural network model stored in the memory when the washing information is received from the washing machine 200, and control the washing cycle of the washing machine 200 based on the extracted parameter.

Figure 1C:
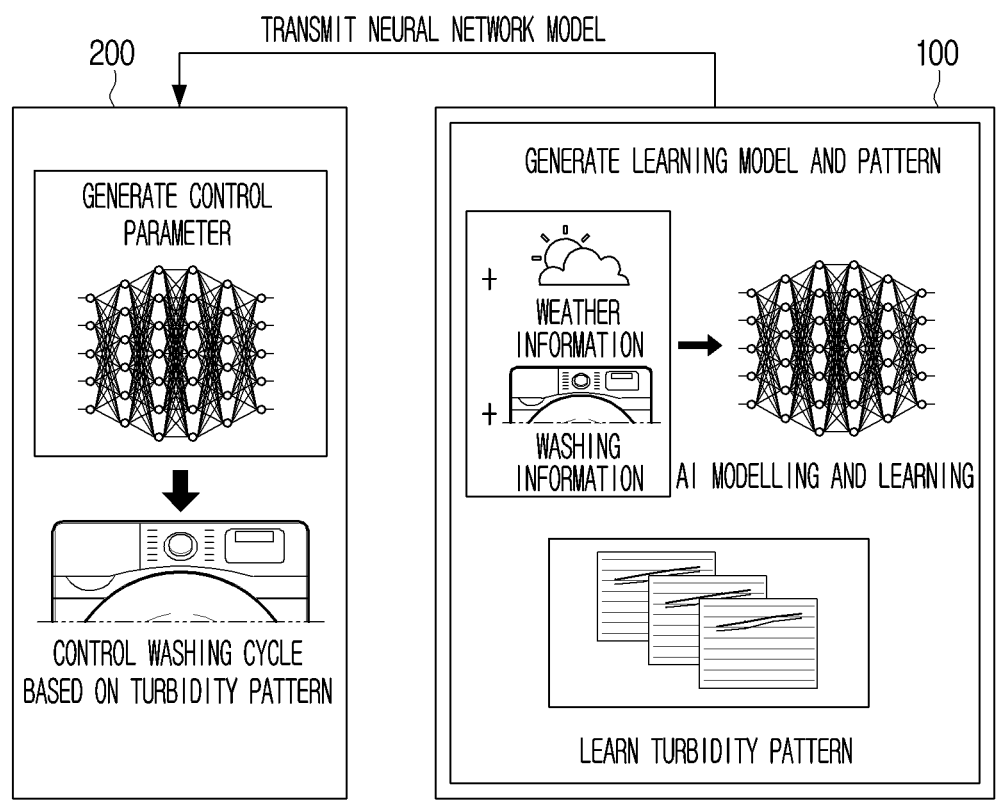
FIG. 1C is a diagram illustrating an embodiment of controlling a washing cycle by using a neural network model stored in a washing machine according to an embodiment of the disclosure.

FIG. 1C is a diagram illustrating an embodiment of controlling a washing cycle by using a neural network model stored in a washing machine according to an embodiment of the disclosure.

However, referring to FIG. 1C, this is one embodiment, and the neural network model may be trained by the server 100, transmitted from the server 100 to the washing machine 200, and stored in the memory of the washing machine 200. The washing machine 200 may be configured to extract a parameter for controlling the washing cycle by using the neural network model stored in the memory of the washing machine 200, and perform a washing cycle based on the extracted parameter. The parameter may be a parameter for controlling at least one of the washing time, the amount of detergent put in, or the number of rinses.

Figure 1D:
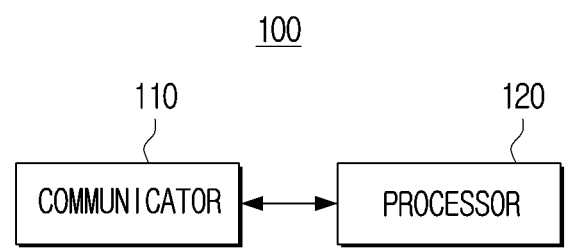
FIG. 1D is a block diagram illustrating a server according to an embodiment of the disclosure.

FIG. 1D is a block diagram illustrating a server according to an embodiment of the disclosure.

Referring to FIG. 1D, the server 100 according to an embodiment may include a communicator 110 and a processor 120.

The communicator 110 may be configured to transmit and receive various data by communicating with the washing machine 200. To this end, the communicator 110 may include at least one of a wireless communication module or a Wi-Fi module. The wireless communication module may be configured to perform communication according the various communication standards such as, for example, and without limitation, IEEE, 3rd Generation (3G), 3rd Generation Partnership Project (3GPP), Long Term Evolution (LTE), 5th Generation (5G), or the like, and the Wi-Fi module may be configured to perform communication in a Wi-Fi method. This is one embodiment, and the communicator 110 may be configured to perform communication with the washing machine 200 through various communication links such as, for example, and without limitation, a local area network (LAN), a wide area network (WAN), or the like In addition, the communicator 110 may be configured to perform communication with the washing machine 200 via an external device. The washing machine 200 may be communicatively connected to an external device through a communication link such as, for example, and without limitation Wi-Fi, Bluetooth, ZigBee, or the like, and configured to transmit and receive various data by communicating with the server through the external device. The external device may be, for example, an access point (AP) configured to relay communication between the server 100 and the washing machine 200. However, this is merely one embodiment, and the external device may be a variety of electronic devices relaying communication between the server 100 and the washing machine 200 such as, for example, and without limitation an internet of things (IoT) hub, a router, a bridge, a repeater, a femtocell, or the like.

The processor 120 may be configured to control the overall operation of the server 100. The processor 120 may be implemented as, for example, at least one of an application specific integrated circuit (ASIC), an embedded processor, a microprocessor, a hardware control logic, or a digital signal processor (DSP). The term processor 120 used herein may be used as a meaning which includes a central processing unit (CPU), a graphics processing unit (GPU), a main processing unit (MPU), and the like.

The processor 120 may be configured to receive the turbidity information of the washing water from the washing machine 200 through the communicator 110. The description thereof will be described with reference to FIG. 1E.

Figure 1E:
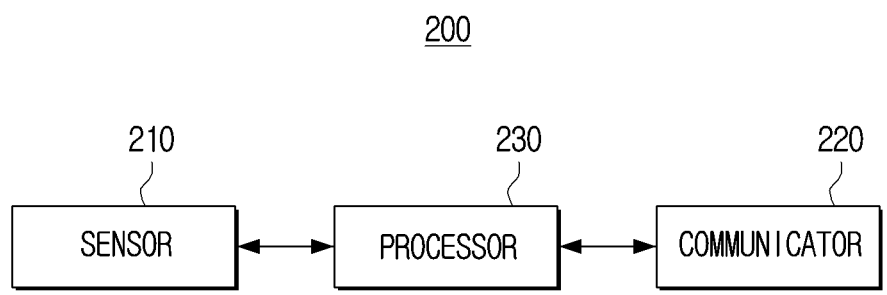
FIG. 1E is a block diagram illustrating a washing machine according to an embodiment of the disclosure.

FIG. 1E is a block diagram illustrating a washing machine according to an embodiment of the disclosure.

Referring to FIG. 1E, the washing machine 200 according to an embodiment may include a sensor 210, a communicator 220, and a processor 230.

The processor 230 of the washing machine 200 may be configured to obtain turbidity information of the washing water through the sensor 210 while washing of the washing water is being performed.

The sensor 210 of the washing machine 200 may be a configuration which includes a light-emitter and a light-receiver, and the light-emitter may be configured to irradiate light to the washing water, and the light-receiver may be configured to receive light which was transmitted to the washing water from among the light irradiated by the light-emitter. In an example, the light-emitter may be configured to irradiate infrared-rays to the washing water, but is not necessarily limited thereto, and visible rays, ultraviolet rays, or the like may be irradiated.

Further, the sensor 210 of the washing machine 200 may be configured to output an electrical signal based on an amount of light which is received in the light-receiver. Specifically, the sensor 210 may be configured to output an electrical signal having an output value which corresponds to the amount of light that is received in the light-receiver. In an example, based on the turbidity of the washing water being low, the amount of light which is received by the light-receiver may be relatively great compared to when the turbidity of the washing water is high. This is because of relatively large impurities or turbid material being present in the washing water with high turbidity when compared with washing water with low turbidity, and thereby most of the light irradiated by the light-emitter is either reflected or absorbed by the impurities or the turbid material and not reach the light-receiver. Accordingly, based on the turbidity of the washing water being low, an output value of the electrical signal which is output by the sensor 210 may be greater than an output value of the electrical signal which is output by the sensor 210 when the turbidity of the washing water is high.

The sensor 210 of the washing machine 200 may be configured to irradiate light to the washing water at pre-set time intervals, and output an electrical signal based on the amount of light irradiated to the light-receiver. The pre-set time may be for example 2-minutes, but is not necessarily limited thereto.

Further, the processor 230 of the washing machine 200 may be configured to control the communicator 220 to transmit the turbidity information which includes an output value of the electrical signal output in pre-set time intervals by the sensor 210 to the server 100.

The sensor 210 as described above may be installed at a position at which the washing water is present within the washing machine 200. For example, the sensor 210 may be installed at a lower part of a tub, that is, an area in which the washing water is pooled of the washing machine 200. However, the embodiment is not limited thereto, and the sensor 210 may be installed at various areas in which washing water is positioned such as an inside of a main body of the washing machine 200 containing the laundry and the washing water.

The sensor 210 of the washing machine 200 may be configured to obtain the turbidity information by irradiating light to the washing water after a passing of a certain time (e.g., 4-minutes) from when washing of the laundry began, but this is one embodiment, and the turbidity information may be obtained by irradiating light to the washing water from the point-in-time the washing water is supplied to within the main body in which the laundry is contained.

The processor 120 of the server 100 may be configured to control, based on turbidity information of the washing water being received at pre-set time intervals from the washing machine 200, the washing cycle of the washing machine 200 based on the amount of change in turbidity information of the washing water for a respective pre-set time. The description thereof will be described below with reference to FIG. 2.

Figure 2:
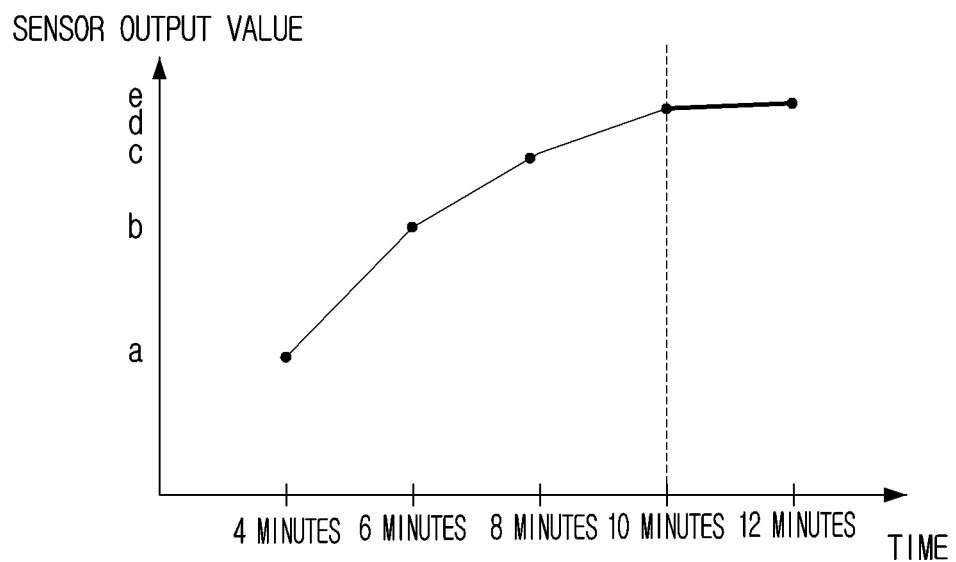
FIG. 2 is a diagram illustrating a value which is output by a sensor of a washing machine at pre-set time intervals according to an embodiment of the disclosure.

FIG. 2 is a diagram illustrating a value which is output by a sensor of a washing machine at pre-set time intervals according to an embodiment of the disclosure.

The processor 120 may be configured to receive the turbidity information of the washing water from the washing machine 200 at the pre-set time intervals through the communicator 110. The turbidity information may include information on the value output by the sensor 210 of the above-described washing machine 200.

The processor 120 may be configured to identify, based on the turbidity information received from the washing machine 200 at the pre-set time intervals, the amount of change in turbidity information of the washing water. The amount of change in turbidity information may be an amount of change in the value output by the sensor 210 of the washing machine 200.

In an example, FIG. 2 is a diagram illustrating an embodiment of the turbidity information being received at 2-minute intervals from the washing machine 200 after the passing of a certain time (e.g., 4-minutes) from when the washing of the laundry began, and in this case, the processor 120 may be configured to identify the amount of change in the turbidity information of the washing water based on the sensor output value included in the turbidity information at 2-minute intervals. Specifically, the processor 120 may be configured to identify the amount of change in turbidity information of the washing water of a first section which is from 4-minutes after laundry began to up to 6-minutes as (b−a)/2, identify the amount of change in turbidity information of the washing water of a second section which is from 6-minutes to up to 8-minutes as (c−b)/2, and identify the amount of change in turbidity information of the washing water of a third section which is from 8-minutes to up to 10-minutes as (d−c)/2.

Then, the processor 120 may be configured to predict the turbidity information of the washing water based on the amount of change in turbidity information of the washing water. Specifically, the processor 120 may be configured to predict, based on being a defaulted time from when the washing cycle began, the turbidity information of the washing water at a point-in-time the pre-set time is passed from the defaulted time. The defaulted time may be a section which performs an initial wash, and may be, for example, 10-minutes, but is not necessarily limited thereto. To this end, the processor 120 may be configured to receive information of a start time of the washing cycle from the washing machine 200.

That is, the processor 120 may be configured to receive the turbidity information of the washing water from the washing machine 200 at the pre-set time intervals for a defaulted time section through the communicator 110, identify the amount of change in turbidity information of the washing water for the respective pre-set time intervals based on the received turbidity information, and predict the turbidity information of the washing water from the defaulted time section to after the pre-set time.

Alternatively, the processor 120 may be configured to receive the turbidity information from the washing machine 200 at the pre-set time intervals, and based on the turbidity information of a number of defaulted times being received, predict the turbidity information of the washing water from when the turbidity information of the number of defaulted times is received to the point-in-time at which the pre-set time is passed.

In an example, referring to FIG. 2, the processor 120 may be configured to predict, based on the defaulted time being 10-minutes and it reaches the defaulted time from when the washing cycle began, that is, when it reaches 10-minutes, the turbidity information of the washing water at a 12-minute point-in-time after the pre-set time is passed therefrom. Alternatively, the processor 120 may be configured to predict, based on the number of defaulted times being 4 times and when the turbidity information is received four times from the washing machine 200, the turbidity information of the washing water at the 12-minute point-in-time which is the pre-set time (e.g., 2-minutes) having passed from the point-in-time at which the fourth turbidity information is received.

Specifically, the processor 120 may be configured to predict the turbidity information of the washing water through a processing of the neural network model trained to predict the turbidity information of the washing water based on the amount of change in the turbidity information of the washing water. To this end, the server 100 of the disclosure may further include a memory for the storing of the neural network model.

Figure 3:
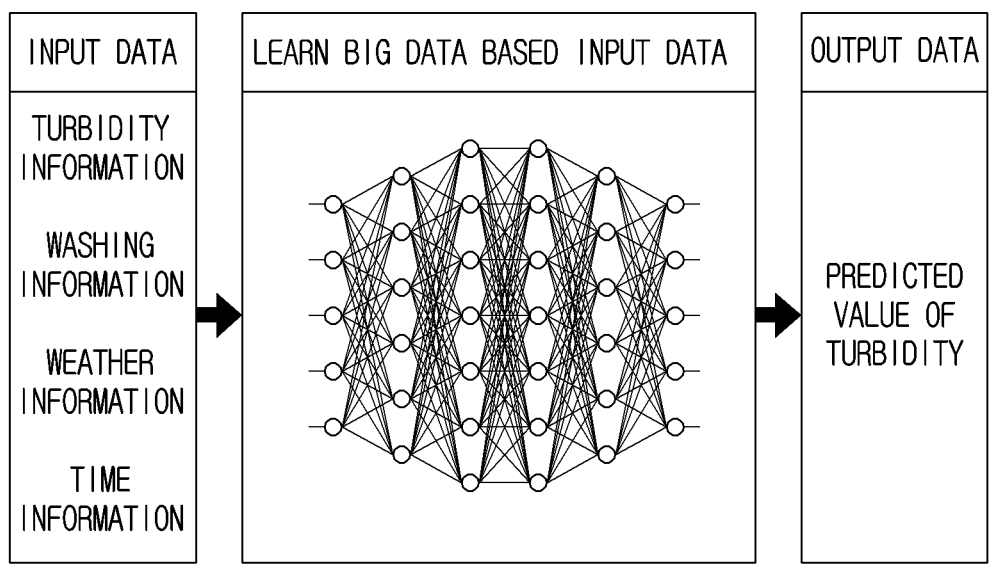
FIG. 3 is a diagram illustrating a neural network model according to an embodiment of the disclosure.

The neural network model of the disclosure will be described below with reference to FIG. 3. FIG. 3 is a diagram illustrating a neural network model according to an embodiment of the disclosure.

The neural network model of the disclosure may be an artificial intelligence model which includes an artificial neural network, and may be trained by deep learning. For example, the neural network model may include at least one of a deep neural network (DNN), a recurrent neural network (RNN), a convolution neural network (CNN), or a generative adversarial network (GAN).

The neural network model of the disclosure may be a model configured to identify the amount of change in turbidity information of the washing water for the respective pre-set time intervals using the turbidity information of the washing water generated at the pre-set time intervals by at least one washing machine as input data, and may be trained to predict the turbidity information of the washing water based on the amount of change in the turbidity information of the washing water. Specifically, the neural network model may be configured to identify, based on the turbidity information of the washing water generated at the pre-set time intervals by the washing machine being input, the amount of change in turbidity information of the washing water based on the input turbidity information of the washing water. Further, the neural network model may train to match the turbidity information of the washing water from the defaulted time to after the pre-set time to the amount of change in turbidity information until the defaulted time. Accordingly, the neural network model may then be configured to output, based on the turbidity information of the washing water being input at the pre-set time intervals for the defaulted time, the turbidity information of the washing water from the defaulted time to after the pre-set time.

Various data other than the above-described turbidity information of the washing water may be input to the neural network model as learning data. In an example, the turbidity information of the washing water generated by the at least one washing machine at the pre-set time intervals and the washing information including the washing course set in the at least one washing machine, the weight of the laundry, the temperature of the washing water, and the like may be input as input data in the neural network model. In this case, the neural network model may be a model configured to identify the amount of change in the turbidity information of the washing water for the respective pre-set time intervals, and may be trained to predict the turbidity information of the washing water which corresponds to the washing information based on the amount of change in the turbidity information of the washing water. Specifically, the neural network model may be configured to identify, based on the turbidity information of the washing water generated at the pre-set time intervals being input by the washing machine, identify the amount of change in the turbidity information of the washing water based on the input turbidity information of the washing water. Then, the neural network model may be trained to match the turbidity information of the washing water from the defaulted time to after the pre-set time to the amount of change in turbidity information until the defaulted time and the above-described washing information. Accordingly, the neural network model may be configured to output, based on the washing information which includes the washing course set in the washing machine thereafter, the weight of the laundry, the temperature of the washing water, or the like, and the turbidity information of the washing water at the pre-set time intervals for a defaulted time being input, the turbidity information of the washing water from the defaulted time to after the pre-set time based on the washing information and the amount of change in turbidity information of the washing water.

Accordingly, the processor 120 may be configured to input, based on the turbidity information of the washing water being received from the washing machine 200 at the pre-set time intervals for the defaulted time, the received turbidity information of the washing water to the neural network model, and obtain the turbidity information of the washing water from the defaulted time section to after the pre-set time as output data of the neural network model.

Referring to FIG. 3, the neural network model may be input with input data which further includes at least one of the weather information or the time information. In this case, the neural network model may be configured to identify the amount of change in turbidity information of the washing water based on the input turbidity information of the washing water, and train to match the turbidity information of the washing water from the defaulted time to after the pre-set time to the amount of change in turbidity information until the defaulted time, washing information, weather information, and time information similar to the above-described technical idea. Accordingly, the neural network model may be configured to output the turbidity information of the washing water from the defaulted time to after the pre-set time based on the washing information, the amount of change in turbidity information of the washing water, the weather information, and the time information when the washing information which includes the washing course set in the washing machine, the weight of the laundry, the temperature of the washing water, and the like, the turbidity information of the washing water generated at the pre-set time intervals for the defaulted time, the weather information of the day at which the washing cycle is performed, and the time information of performing the washing cycle is input.

The processor 120 may be configured to identify the washing cycle of the washing machine 200 based on the turbidity information of the washing water predicted through the processing of the neural network model. Specifically, the processor 120 may be configured to identify the turbidity pattern of the washing water based on the predicted turbidity information of the washing water, and identify the washing cycle based on the turbidity pattern of the washing water.

Referring back to FIG. 2, the processor 120 may be configured to predict the turbidity information of the washing water from the defaulted time (e.g., 10-minutes) to after the present time (e.g., 2-minutes) through the processing of the neural network model. In an example, the sensor output value included in the predicted turbidity information of the washing water may be value e as illustrated in FIG. 2.

The processor 120 may be configured to identify the turbidity pattern of the washing water based on the turbidity information most recently received from among the turbidity information received at the pre-set time intervals from the washing machine 200 or the predicted turbidity information of the washing water. The turbidity pattern may be a difference between the sensor output value included in the turbidity information and the predicted sensor output value. In an example, based on the predicted output value of the sensor being value e as in FIG. 2, the processor 120 may be configured to identify the turbidity pattern of the washing water based on value e-d which calculated the sensor output value d included in the turbidity information most recently received from among the turbidity information received at the pre-set time intervals or the predicted sensor output value e.

The turbidity pattern of the washing water may be one of the rising pattern, the maintaining pattern, and the descending pattern.

Figure 4:
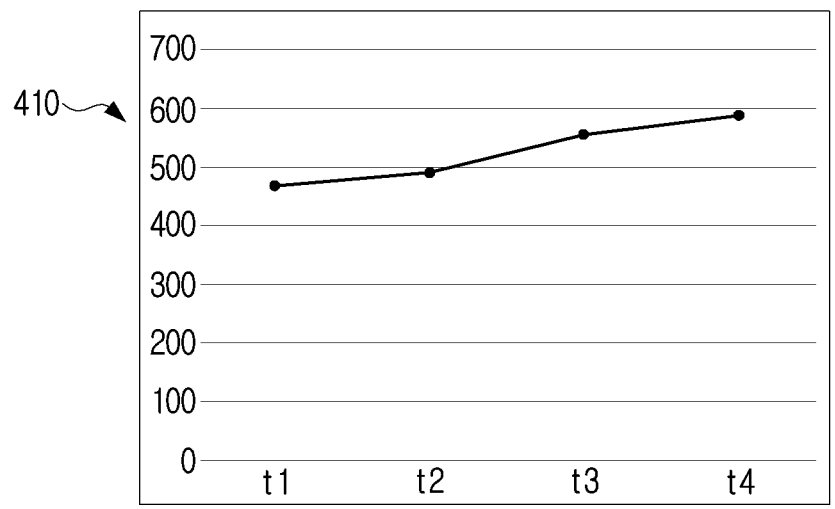
FIG. 4 is a diagram illustrating a turbidity pattern of a washing water according to an embodiment of the disclosure.
Figure 4:
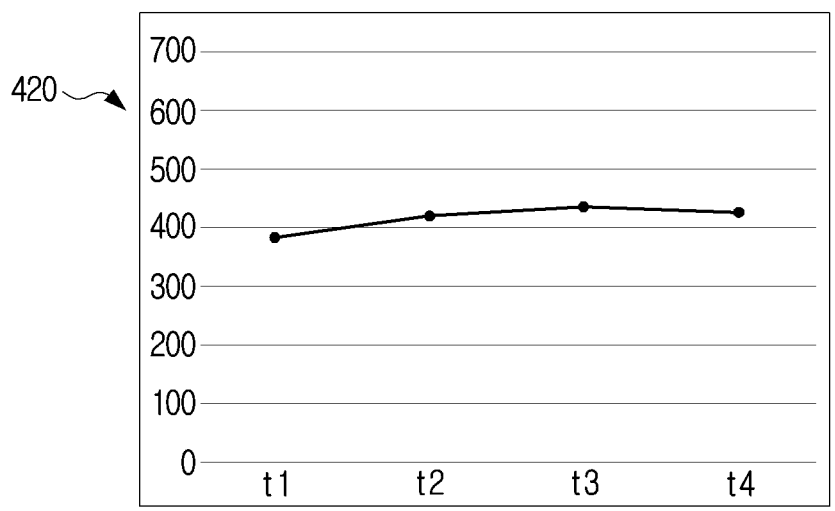
Figure 4:
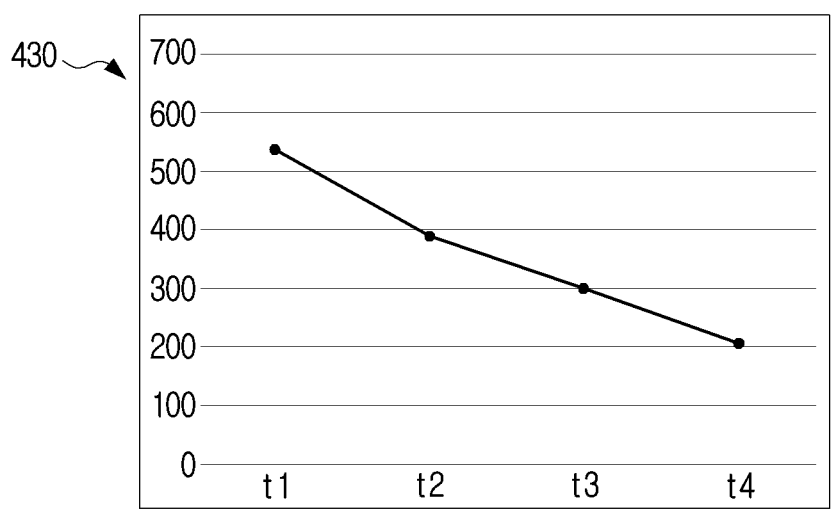

For example, referring to FIG. 4, the turbidity pattern of the washing water may be one of the rising pattern 410 of which the predicted sensor output value is greater than or equal to a threshold value than the sensor output value included in the turbidity information received from the washing machine 200, the maintaining pattern 420 of which the sensor output value included in the turbidity information and the predicted sensor output value are different by less than the threshold value, and the descending pattern 430 of which the predicted sensor output value is less than or equal to the threshold value than the sensor output value included in the turbidity information.

The processor 120 may be configured to transmit a control signal for controlling the washing cycle of the washing machine 200 to the washing machine 200 through the communicator 110 based on the turbidity pattern of the washing water. In an example, the processor 120 may be configured to transmit the control signal for controlling at least one of the washing time, the amount of detergent put in, or the number of rinses to the washing machine 200 through the communicator 110 based on the turbidity pattern of the washing water.

Specifically, the processor 120 may be configured to transmit the control signal for reducing at least one of the washing time, the amount of detergent put in, or the number of rinses of the washing machine to the washing machine 200 through the communicator 110 based on the turbidity pattern of the washing water being a rising pattern.

In an example, even if it is laundry of a low degree of contamination based on the washing, the turbidity pattern of the washing water may be a rinsing pattern by the washing water which is supplied in the washing process. In this case, the disclosure may prevent unnecessary consumption of washing time, putting in detergent, and rinsing cycle by transmitting the control signal for reducing at least one of the washing time, the amount of detergent put in, or the number of rinses of the washing machine 200 to the washing machine 200.

Alternatively, the processor 120 may be configured to transmit, based on the turbidity pattern of the washing water being a descending pattern, the control signal for increasing at least one of the washing time, the amount of detergent put in, or the number of rinses of the washing machine 200 to the washing machine 200 through the communicator 110.

In an example, based on it being laundry of a high degree of contamination, the washing water of a point-in-time at which the defaulted time is passed after the washing cycle may include much impurities, and thereby the turbidity pattern of the washing water may be a descending pattern. In this case, the disclosure may, by transmitting the control signal for increasing at least one of the washing time, the amount of detergent put in, or the number of rinses of the washing machine 200 to the washing machine 200, prevent laundry from being not sufficiently washed by washing according to the washing cycle set by a user (or, automatically set according to the weight of the laundry, etc.) despite it being a laundry of a high degree of contamination.

Alternatively, the processor 120 may be configured to transmit, based on the turbidity pattern of the washing water being a maintaining pattern, the control signal to control so that the washing according to the washing cycle set in the washing machine 200 is continuously performed to the washing machine 200 through the communicator 110. According to an embodiment, based on the turbidity pattern of the washing water being a maintaining pattern, the server 100 may be configured to not transit the control signal to the washing machine 200.

The information on washing time, the amount of detergent put in, and the number of rinses which is identified based on the turbidity pattern of the washing water may be pre-stored in the memory of the server 100. In an example, the server 100 may be configured to store a plurality of washing cycle information (here, the washing cycle information may include information on the washing time, the amount of detergent put in, and the number of rinses) which correspond to a plurality of turbidity patterns. In this case, the processor 120 may be configured to identify, based on the turbidity pattern of the washing water being identified, the washing cycle information which corresponds with the turbidity pattern of the washing water from among the plurality of washing cycle information stored in the memory.

In addition, the washing cycle information which corresponds to the turbidity pattern of the washing water may be obtained by the processing of the neural network model.

Figure 5A:
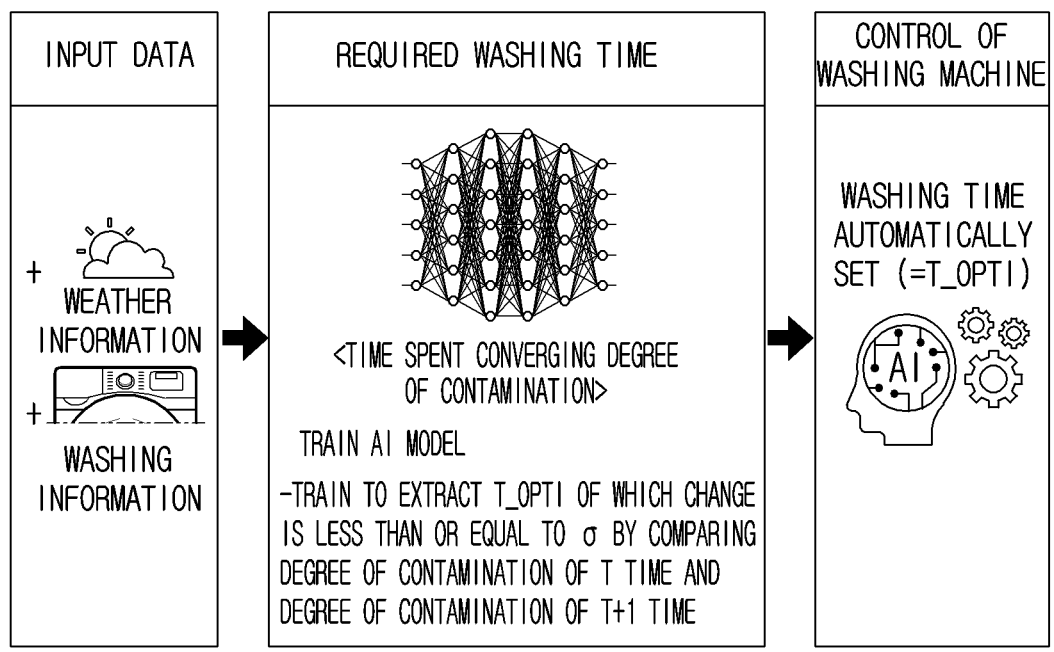
FIG. 5A is a diagram illustrating an embodiment of controlling a washing time according to an embodiment of the disclosure.

FIG. 5A is a diagram illustrating an embodiment of controlling a washing time according to an embodiment of the disclosure. For example, referring to FIG. 5A, FIG. 5A is a diagram illustrating an embodiment of controlling the washing time by using the neural network model according to an embodiment of the disclosure, in which the neural network model may be configured to receive washing information (including turbidity information) generated by the at least one washing machine as input data. In addition, the neural network model according to an embodiment may also receive the weather information generated by the weather server as input data together with the washing information. Further, the neural network model may be configured to identify the amount of change in turbidity information of the washing water for the respective pre-set time intervals using the turbidity information of the washing water generated at the pre-set time intervals by the at least one washing machine as input data, and may be trained to output information on the washing time which converges the amount of change in turbidity information of the washing water to within a threshold range based on the amount of change in the turbidity information of the washing water. Further, the processor 120 may be configured to generate a control signal for controlling the washing time of the washing machine 200 through the trained neural network model. Specifically, the processor 120 may be configured to input the washing information received from the washing machine 200 as input data of the neural network model, and obtain information on the washing time which converges the amount of change in turbidity information of the washing water to within the threshold range through the processing of the neural network model as output data of the neural network model. Then, the processor 120 may be configured to transmit, based on the information on the washing time included in the output data, the control signal for controlling the washing time of the washing machine 200 to the washing machine 200.

Figure 5B:
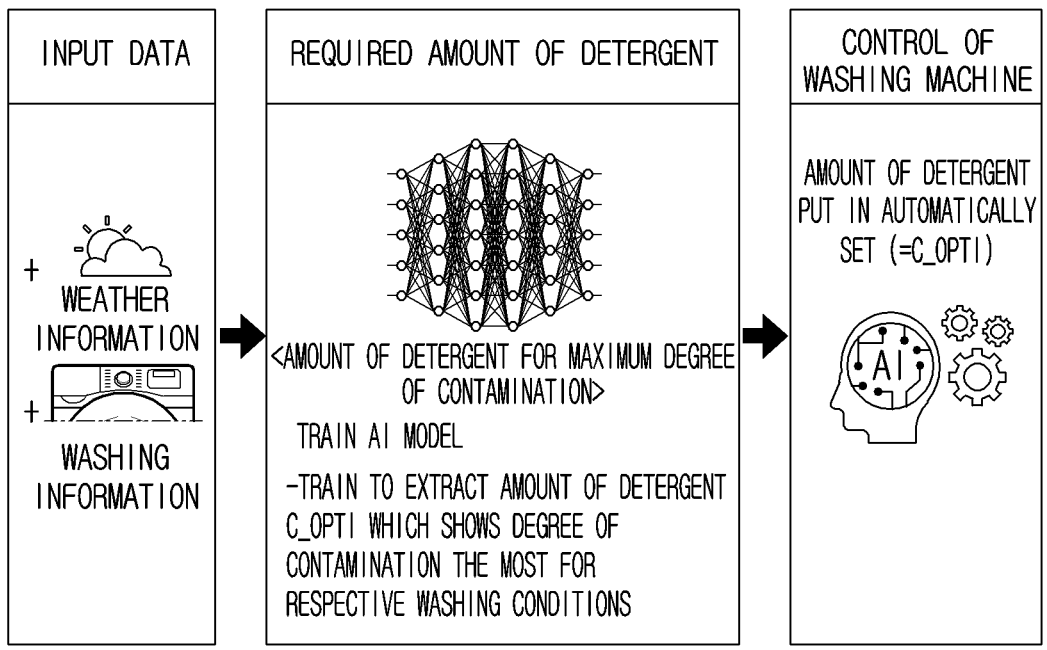
FIG. 5B is a diagram illustrating an embodiment of controlling an amount of detergent put in according to an embodiment of the disclosure.

FIG. 5B is a diagram illustrating an embodiment of controlling an amount of detergent put in according to an embodiment of the disclosure. Referring to FIG. 5B, FIG. 5B is a diagram illustrating an embodiment of controlling the amount of detergent put in by using the neural network model according to an embodiment of the disclosure, in which the neural network model may be configured to receive washing information (including turbidity information) generated by the at least one washing machine as input data. In addition, the neural network model according to an embodiment may be configured to also receive the weather information generated by the weather server as input data together with the washing information. Further, the neural network model may be trained to output information on the amount of detergent put in (e.g., the amount of detergent put in which may increase the turbidity of the washing water the most) in which the amount of change in turbidity information of the washing water is greater than or equal to a first threshold value based on the amount of change in turbidity information of the washing water. Further, the processor 120 may be configured to generate a control signal for controlling the amount of detergent put in through the trained neural network model. Specifically, the processor 120 may be configured to input the washing information received from the washing machine 200 as input data of the neural network model, and obtain information on the amount of detergent put in, of which the amount of change in turbidity information of the washing water is greater than or equal to the first threshold value, as output data of the neural network model through the processing of the neural network model. Then, the processor 120 may be configured to control, by transmitting the control signal for putting in detergent to the washing machine 200 based on information on the amount of detergent put in included in the output data of the neural network model, the washing machine 200 so that detergent of an optimized amount to the washing of the laundry is put in to the laundry.

Figure 5C:
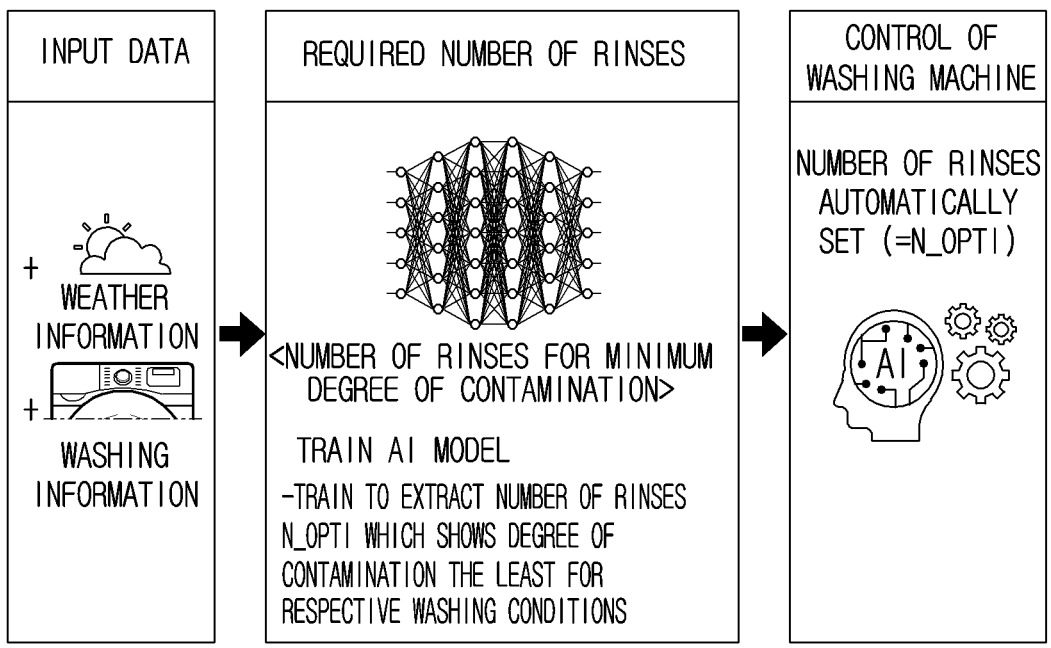
FIG. 5C is a diagram illustrating an embodiment of controlling a rinsing time according to an embodiment of the disclosure.

FIG. 5C is a diagram illustrating an embodiment of controlling a rinsing time according to an embodiment of the disclosure. Referring to FIG. 5C, FIG. 5C is a diagram illustrating an embodiment of controlling the number of rinses by using the neural network model according to an embodiment of the disclosure, in which the neural network model may be configured to receive washing information (including turbidity information) generated by the at least one washing machine as input data. In addition, the neural network model according to an embodiment may also receive the weather information generated by the weather server as input data together with the washing information. Further, the neural network model may be trained to output information on the number of rinses (e.g., the number of rinses which may decrease the turbidity of the washing water the most) in which the change in turbidity of the washing water at the rinsing step after the washing is less than or equal to a second threshold value based on the amount of change in turbidity information of the washing water. Further, the processor 120 may be configured to generate a control signal for controlling the number of rinses through the trained neural network model. Specifically, the processor 120 may be configured to input the washing information received from the washing machine 200 as input data of the neural network model, and obtain information on the number of rinses, of which the change in turbidity of the washing water at the rinsing step after the washing is less than or equal to the second threshold value, as output data of the neural network model through the processing of the neural network model. Then, the processor 120 may be configured transmit the control signal for controlling the rinsing cycle based on information on the number of rinses included in the output data of the neural network model to the washing machine 200. In an example, the neural network model may be configured to output, based on the change in turbidity of the washing water in a first rinse cycle step and the turbidity change in the washing water in a second rinse cycle step being less than or equal to the second threshold value with respect to the same laundry, a first time rinsing information as output data, and the processor 120 may be configured to transmit the control signal for performing the first time rinsing cycle to the washing machine 200.

The processor 120 may be configured to identify, based on the turbidity pattern of the washing water and a plurality of threshold values, the washing cycle of the washing machine 200.

Specifically, the processor 120 may be configured to transmit, based on the turbidity pattern of the washing water being a rising pattern and a difference between the most recent turbidity information of the washing water and the predicted turbidity information of the washing water being greater than or equal to the first threshold value, at least one of a signal for reducing the washing time of the washing machine 200 by a first time, a signal for reducing the amount of detergent put in by a first quantity, or a signal for reducing the number of rinses by a first number of times to the washing machine 200 through the communicator 110.

If the turbidity pattern of the washing water is a rising pattern, and the difference between most recent turbidity information of the washing water and the predicted turbidity information of the washing water is greater than or equal to the second threshold value which is higher than the first threshold value, the processor 120 may be configured to transmit at least one of the signal for reducing the washing time of the washing machine by a second time which is longer than the first time, the signal for reducing the amount of detergent put in by a second quantity which is smaller than the first quantity, or the signal for reducing the number of rinses by a second number of times which is less than the first number of times to the washing machine 200 through the communicator 110.

FIG. 5D is a diagram illustrating an embodiment of controlling a washing cycle based on a turbidity pattern of a washing water according to an embodiment of the disclosure. In an example, referring to FIG. 5D, the processor 120 may be configured to transmit, based on the turbidity pattern of the washing water being a rising pattern and the difference between the most recent turbidity information of the washing water and the predicted turbidity information of the washing water exceeding the first threshold value of 50, at least one of the signal for reducing the washing time set in the washing machine 200 by 2-minutes, the signal for reducing the amount of detergent put in set in the washing machine 200 by 1.0 ml, or the signal for reducing the number of rinses set in the washing machine 200 by one time to the washing machine 200 through the communicator. The washing time, the amount of detergent put in, and the number of rinses set in the washing machine herein may be a value set based on the washing course, the weight of the laundry, or the like set according to a washing start command being input to the washing machine 200.

In addition, referring to FIG. 5D, based on the turbidity pattern of the washing water being a rising pattern, and the difference between the most recent turbidity information of the washing water and the predicted turbidity information of the washing water exceeding the second threshold value of 100, the processor 120 may be configured to transmit at least one of the signal for reducing the washing time set in the washing machine 200 by 5-minutes, the signal for reducing the amount of detergent put in set in the washing machine 200 by 2.5 ml, or the signal for reducing the number of rinses set in the washing machine 200 by one time to the washing machine 200 through the communicator 110. This is because of the need to prevent the unnecessary consumption of washing time or the amount of detergent put in by further reducing the washing time or the amount of detergent put in and the number of rinses when the washing of the laundry of a lesser degree of contamination is performed the greater the difference between the most recent turbidity information of the washing water and the predicted turbidity information of the washing water is based on the turbidity pattern of the washing water being a rising pattern.

The processor 120 may be configured to transmit, based on the turbidity pattern of the washing water being a descending pattern, and the difference between the most recent turbidity information of the washing water and the predicted turbidity information of the washing water being greater than or equal to a third threshold value, at least one of the signal for increasing the washing time of the washing machine 200 by a third time, the signal for increasing the amount of detergent put in by a third quantity, or the signal for increasing the number of rinses by a third number of times to the washing machine 200 through the communicator 110.

If the turbidity pattern of the washing water is a descending pattern, and the difference between the most recent turbidity information of the washing water and the predicted turbidity information of the washing water is greater than or equal to a fourth threshold value which is higher than the third threshold value, the processor 120 may be configured to transmit at least one of the signal for increasing the washing time of the washing machine 200 by a fourth time which is longer than the third time, the signal for increasing the amount of detergent put in by a fourth quantity which is greater than the third quantity, or the signal for increasing the number of rinses by a fourth number of times which is more than the third number of times to the washing machine 200 through the communicator 110.

In an example, referring to FIG. 5D, the processor may be configured to transmit, based on the turbidity pattern of the washing water being a descending pattern, and the difference between the most recent turbidity information of the washing water and the predicted turbidity information of the washing water exceeding the third threshold value of 50, at least one of the signal for increasing the washing time set in the washing machine 200 by 3-minutes, the signal for increasing the amount of detergent put in set in the washing machine 200 by 1.5 ml, or the signal for increasing the number of rinses set in the washing machine 200 by one time to the washing machine 200 through the communicator 110.

In addition, referring to FIG. 5D, based on the turbidity pattern of the washing water being a descending pattern, and the difference between the most recent turbidity information of the washing water and the predicted turbidity information of the washing water exceeding the fourth threshold value of 100, the processor 120 may be configured to transmit at least one of the signal for increasing the washing time set in the washing machine 200 by 6-minutes, the signal for increasing the amount of detergent put in set in the washing machine 200 by 3.0 ml, or the signal for increasing the number of rinses set in the washing machine 200 by one time to the washing machine 200 through the communicator 110.

This is because of the need to wash the contaminated laundry by further increasing the washing time or the amount of detergent put in and the number of rinses when the washing of the laundry of a greater degree of contamination is performed the greater the difference between the most recent turbidity information of the washing water and the predicted turbidity information of the washing water is based on the turbidity pattern of the washing water being a descending pattern.

The information on the washing time, the amount of detergent put in, and the number of rinses which is identified based on the turbidity pattern of the washing water and the threshold value may be pre-stored in the memory of the server 100. In an example, the server 100 may be configured to classify and store the washing information (here, the washing information may include information on the washing time, the amount of detergent put in, and the number of rinses) for the respective turbidity patterns of the washing water based on the threshold value. In this case, the processor 120 may be configured to identify, based on the turbidity information of the washing water being predicted, information for controlling the washing time, the amount of detergent put in, and the number of rinses currently set in the washing machine 200 based on the turbidity pattern of the washing water, the difference between the most recent turbidity information of the washing water and the predicted turbidity information of the washing water, and a plurality of threshold values using the information stored in the memory.

In addition, the information on the washing time, the amount of detergent put in, and the number of rinses which is identified based on the turbidity pattern of the washing water and the threshold value may be obtained by the processing of the neural network model.

The neural network model may be configured to identify the amount of change in turbidity information of the washing water for the respective pre-set time intervals using the turbidity information of the washing water generated at the pre-set time intervals by the at least one washing machine as input data, and may be trained to output information on the time in which the amount of change in turbidity information of the washing water is converged within the threshold range based on the amount of change in turbidity information of the washing water. In addition, the neural network model may be trained to output information on the amount of detergent put in (e.g., the amount of detergent put in which may increase the turbidity of the washing water the most) in which the amount of change in turbidity information of the washing water is greater than or equal to the first threshold value based on the amount of change in turbidity information of the washing water, or trained to output information on the number of rinses (e.g., the number of rinses which may decrease the turbidity of the washing water the most) in which the change in turbidity of the washing water at the rinsing step after the washing is less than or equal to the second threshold value based on the amount of change in turbidity information of the washing water.

The first to fourth threshold values above are one example, and the numerical value of the threshold value may vary according to the embodiment. In addition, in the above, two threshold values have been described as being applied to the rising pattern and the descending pattern respectively, but three or more threshold values may be applied according to the embodiment. In an example, referring to FIG. 5D, the processor 120 may be configured to transmit, based on the turbidity pattern of the washing water being a descending pattern, and the difference between the most recent turbidity information of the washing water and the predicted turbidity information of the washing water exceeding a fifth threshold value of 150, at least one of the signal for increasing the washing time set in the washing machine 200 by 10-minutes, the signal for increasing the amount of detergent put in set in the washing machine 200 by 5.0 ml, or the signal for increasing the number of rinses set in the washing machine 200 by two times to the washing machine 200 through the communicator 110.

In addition, the above-described control of the washing time, the amount of detergent put in, and the number of rinses is one embodiment, and the processor 120 may be configured to transmit, based on the turbidity pattern of the washing water, the signal for controlling various functions related to the washing cycle such as the amount of water supplied of the washing water, and the option set in the washing machine to the washing machine 200 through the communicator 110.

As illustrated in FIG. 5D, the processor 120 may be configured to transmit, based on the turbidity pattern of the washing water being a maintaining pattern of less than or equal to the threshold value of 50, the control signal for controlling the washing to be performed continuously according to the washing cycle set in the washing machine 200. According to an embodiment, based on the turbidity pattern of the washing water being a maintaining pattern, the server 100 may be configured to not transmit the control signal to the washing machine 200.

Figure 6:
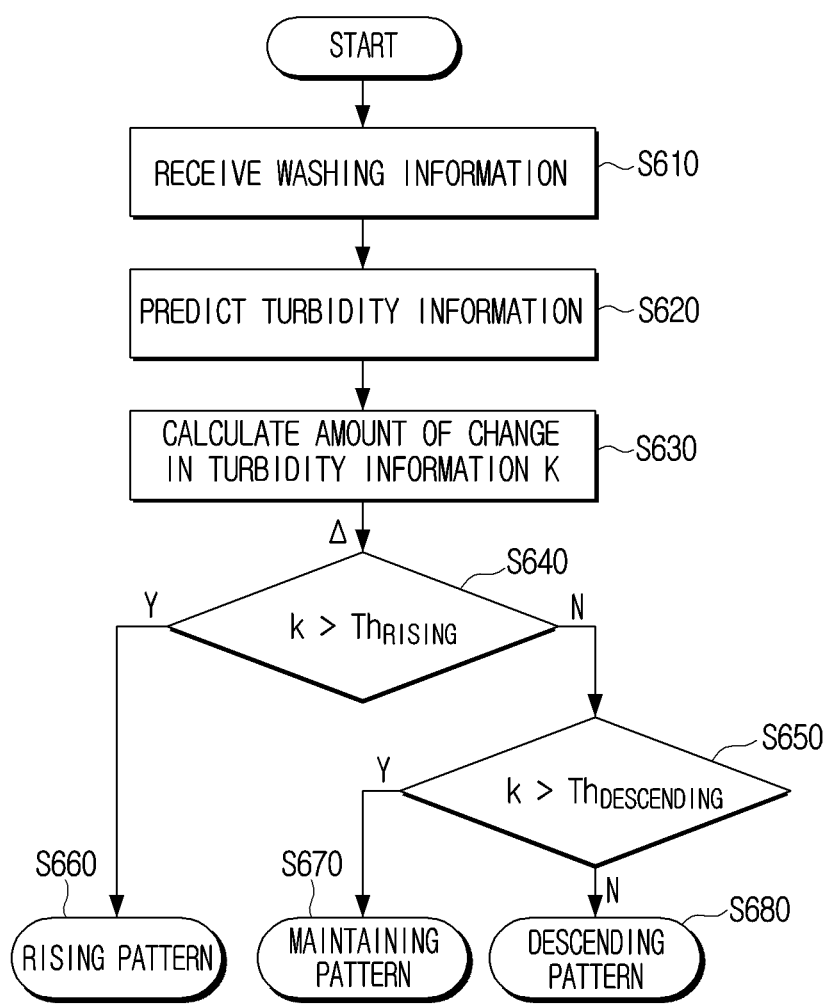
FIG. 6 is a flowchart illustrating an embodiment of identifying a turbidity pattern of a washing water according to an embodiment of the disclosure.

FIG. 6 is a flowchart illustrating an embodiment of identifying a turbidity pattern of a washing water according to an embodiment of the disclosure.

Referring to FIG. 6, the server 100 according to an embodiment may be configured to receive washing information of the washing machine 200 from the washing machine 200 at operation S610. The washing information may include an identifier (ID) of the washing machine, a washing course set in the washing machine 200, the weight of the laundry, and the turbidity information of the washing water. Further, the turbidity information may include information on the output value of the electrical signal which is output by the sensor of the washing machine 200, and the output value of the electrical signal may have a low value the greater the turbidity of the washing water is.

The server 100 may be configured to predict the degree of contamination of the washing water by inputting the washing information as input data in the neural network model at operation S620. The neural network model may be a model configured to identify the amount of change in turbidity information of the washing water for the respective pre-set time intervals using the washing information which includes the turbidity information of the washing water generated by the at least one washing machine at the pre-set time intervals as input data, and may be trained to predict the turbidity information of the washing water based on the amount of change in the turbidity information of the washing water. Further, the server 100 may be configured to input, based on the turbidity information of the washing water being received from the washing machine 200 by the pre-set time intervals for the defaulted time section, the received turbidity information of the washing water to the neural network model, and obtain the turbidity information of the washing water from the defaulted time section to after the pre-set time as output data of the neural network model.

The server 100 may be configured to calculate the amount of change in turbidity information based on the turbidity information most recently received from among the turbidity information received from the washing machine 200 or the predicted turbidity information of the washing water at operation S630. The amount of change in turbidity information may be a difference between the sensor output value included in the turbidity information received from the washing machine 200 and the predicted sensor output value.

Further, the server 100 may be configured to identify whether the amount of change in turbidity information exceeds the first threshold value at operation S640. If the amount of change in turbidity information exceeds the first threshold value, the server 100 may be configured to identify the turbidity pattern of the washing water as the rising pattern at operation S660. For example, based on the amount of change in turbidity information k exceeding the first threshold value of 50, the server 100 may be configured to identify the turbidity pattern of the washing water as the rising pattern at operation S660.

The server 100 may be configured to identify whether the amount of change in turbidity information exceeds the second threshold value based on the amount of change in turbidity information being less than or equal to the first threshold value at operation S650. Then, the server 100 may be configured to identify, based on the amount of change in turbidity information exceeding the second threshold value, the turbidity pattern of the washing water as the maintaining pattern at operation S670, and based on the amount of change in turbidity information being less than or equal to the second threshold value, identify the turbidity pattern of the washing water as the descending pattern at operation S680. For example, based on the amount of change in turbidity information k being less than the first threshold value of 50 and greater than the second threshold value of −50, the server 100 may be configured to identify the turbidity pattern of the washing water as the maintaining pattern at operation S670, and based on the amount of change in turbidity information k being less than the second threshold value of −50, the server 100 may be configured to identify the turbidity pattern of the washing water as the descending pattern at operation S680.

Figure 7:
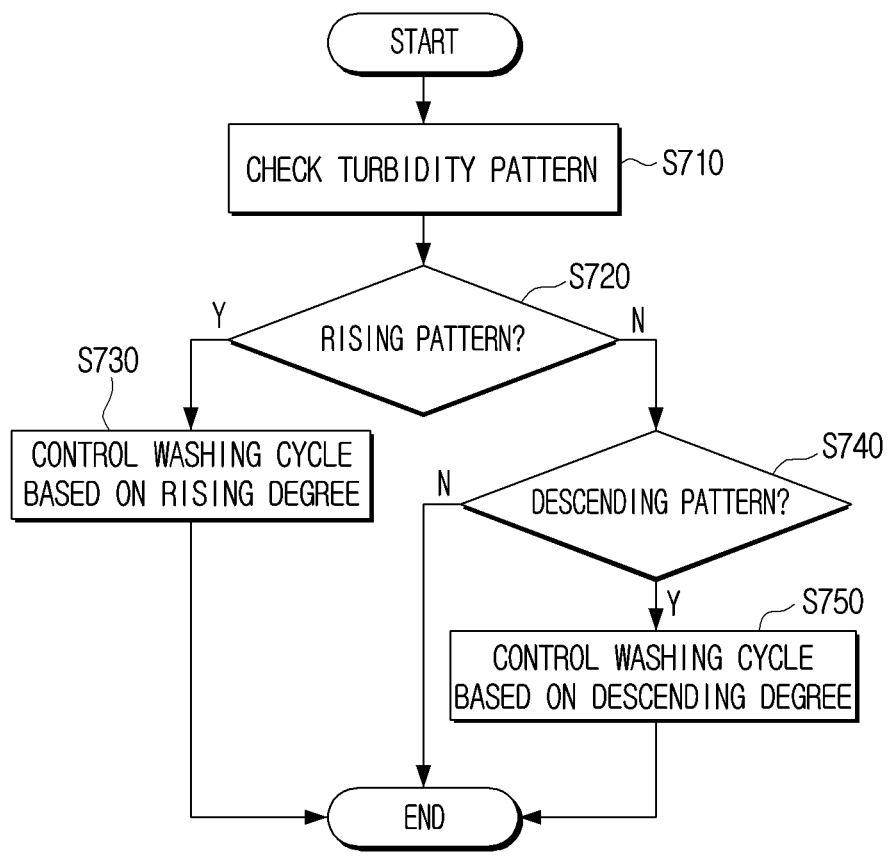
FIG. 7 is a flowchart illustrating an embodiment of controlling a washing cycle according to a turbidity pattern of a washing water according to an embodiment of the disclosure.

FIG. 7 is a flowchart illustrating an embodiment of controlling a washing cycle according to a turbidity pattern of a washing water according to an embodiment of the disclosure.

Referring to FIG. 7, the server 100 as described above may be configured to identify whether the turbidity pattern of the washing water is a rising pattern, a descending pattern, or a maintaining pattern based on the amount of change in turbidity information at operation S710.

Then, the server 100 may be configured to control, based on the turbidity pattern of the washing water being identified as a rising pattern in operation S720, the washing cycle based on the rising degree of the turbidity pattern at operation S730.

Specifically, the server 100 may be configured to transmit, based on the turbidity pattern of the washing water being a rising pattern and the amount of change in turbidity information being greater than or equal to the first threshold value, at least one of the signal for reducing the washing time of the washing machine 200 by the first time, the signal for reducing the amount of detergent put in by the first quantity, or the signal for reducing the number of rinses by the first number of times to the washing machine 200. Alternatively, the server 100 may be configured to, based on the turbidity pattern of the washing water being a rising pattern and the amount of change in turbidity information being greater than or equal to the second threshold value which is higher than the first threshold value, at least one of the signal for reducing the washing time of the washing machine 200 by the second time which is longer than the first time, the signal for reducing the amount of detergent put in by the second quantity which is lesser than the first quantity, or the signal for reducing the number of rinses by the second number of times which is lesser than the first number of times to the washing machine 200.

The server 100 may be configured to identify, based on the turbidity pattern of the washing water being identified as not the rising pattern in operation S720, whether the turbidity pattern is a descending pattern at operation S740, and control the washing cycle based on the descending degree of the turbidity pattern based on the turbidity pattern of the washing water being identified as the descending pattern at operation S750.

Specifically, the server 100 may be configured to transmit, based on the turbidity pattern of the washing water being a descending pattern and the amount of change in turbidity information being greater than or equal to the third threshold value, at least one of the signal for increasing the washing time of the washing machine 200 by the third time, the signal for increasing the amount of detergent put in by the third quantity, or the signal for increasing the number of rinses by the third number of times to the washing machine 200, and based on the turbidity pattern of the washing water being a descending pattern and the amount of change in turbidity information being greater than or equal to the fourth threshold value which is higher than the third threshold value, transmit at least one of the signal for increasing the washing time of the washing machine 200 by the fourth time which is longer than the third time, the signal for increasing the amount of detergent put in by the fourth quantity which is greater than the third quantity, or the signal for increasing the number of rinses by the fourth number of times which is greater than the third number of times to the washing machine 200.

If the turbidity pattern of the washing water is identified as the maintaining pattern in operation S740, the control signal for controlling the washing to be performed continuously according to the washing cycle set in the washing machine 200 may be transmitted to the washing machine 200. According to an embodiment, based on the turbidity pattern of the washing water being a maintaining pattern, the server 100 may be configured to not transmit the control signal to the washing machine 200.

Figure 8:
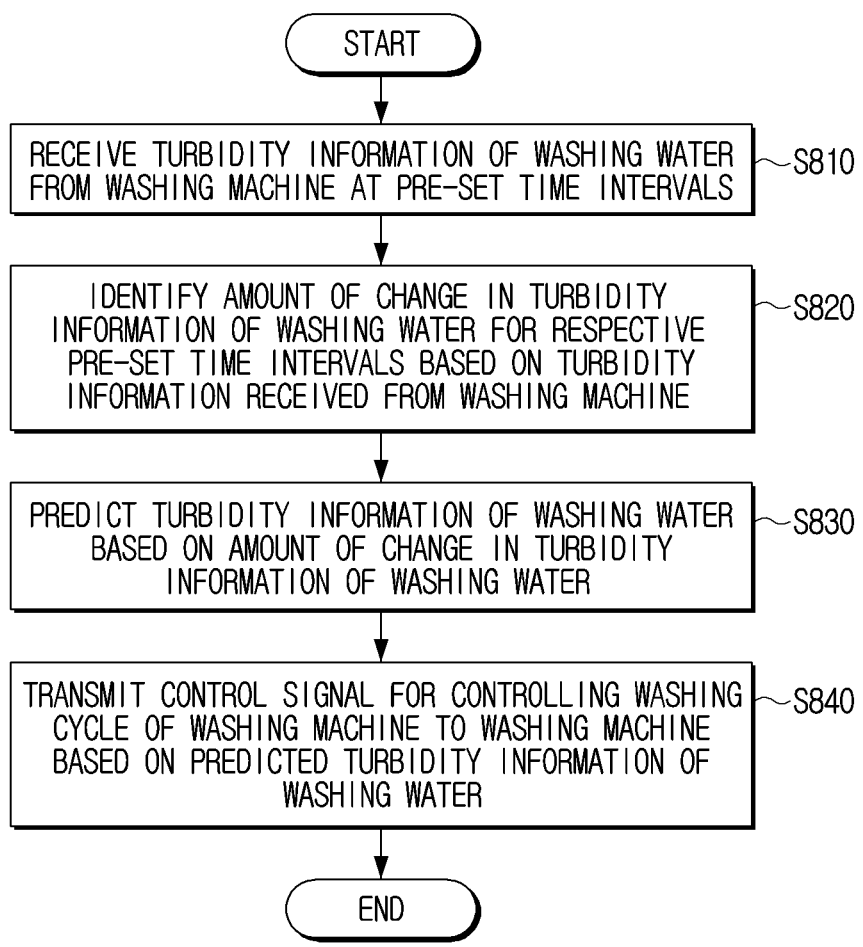
FIG. 8 is a flowchart illustrating a control method of a server according to an embodiment of the disclosure.

FIG. 8 is a flowchart illustrating a control method of a server according to an embodiment of the disclosure.

Referring to FIG. 8, the server 100 may be configured to receive the turbidity information of the washing water from the washing machine 200 at the pre-set time intervals at operation S810.

Specifically, the server 100 may be configured to receive the turbidity information of the washing water at the pre-set time intervals from the washing machine 200 through the washing machine 200 or a relay device communicatively connected with the washing machine 200. The turbidity information may include information on a value output by the sensor of the washing machine 200.

The server 100 may be configured to identify the amount of change in turbidity information of the washing water for the respective pre-set time intervals based on the turbidity information received from the washing machine 200 at operation S820. The amount of change in turbidity information may be an amount of change in the value output by the sensor of the washing machine 200.

The server 100 may be configured to predict the turbidity information of the washing water based on the amount of change in turbidity information of the washing water at operation S830. Specifically, the server 100 may be configured to predict the turbidity information of the washing water based on the processing of the neural network model. The neural network model may be a model configured to identify the amount of change in turbidity information of the washing water for the respective pre-set time intervals using the turbidity information of the washing water generated by the at least one washing machine at the pre-set time intervals as input data, and may be trained to predict the turbidity information of the washing water based on the amount of change in the turbidity information of the washing water. Further, the server 100 may be configured to input, based on the turbidity information of the washing water being received from the washing machine 200 at the pre-set time intervals fur the defaulted time section, the received turbidity information of the washing water to the neural network model, and obtain the turbidity information of the washing water from the defaulted time section to after the pre-set time as output data of the neural network model.

The server 100 may be configured to transmit the control signal for controlling the washing cycle of the washing machine 200 to the washing machine 200 based on the predicted turbidity information of the washing water at operation S840.

Specifically, the server 100 may be configured to transmit, based on the turbidity pattern of the washing water being a rising pattern, the control signal for reducing at least one of the washing time, the amount of detergent put in, or the number of rinses of the washing machine 200 to the washing machine 200, and based on the turbidity pattern of the washing water being a descending pattern, transmit the control signal for increasing at least one of the washing time, the amount of detergent put in, or the number of rinses of the washing machine 200 to the washing machine 200.

In the above, the washing machine 200 has been described as being controlled based on the turbidity information of the washing water, but this is one embodiment, and the server 100 according to an embodiment may be configured to control the washing machine 200 based on the turbidity of the washing water itself. The turbidity of the washing water may be in nephelometric turbidity unit (NTU) unit, but is not necessarily limited thereto. In an example, the server 100 may be configured to add at least one of the washing time, the amount of detergent put in, or the number of rinses based on the amount of change in turbidity of the washing water being a rising pattern due to the high degree of contamination of the laundry, and decrease at least one of the washing time, the amount of detergent put in, or the number of rinses based on the amount of change in turbidity of the washing water being a descending pattern due to the low degree of contamination of the laundry.

Figure 9:
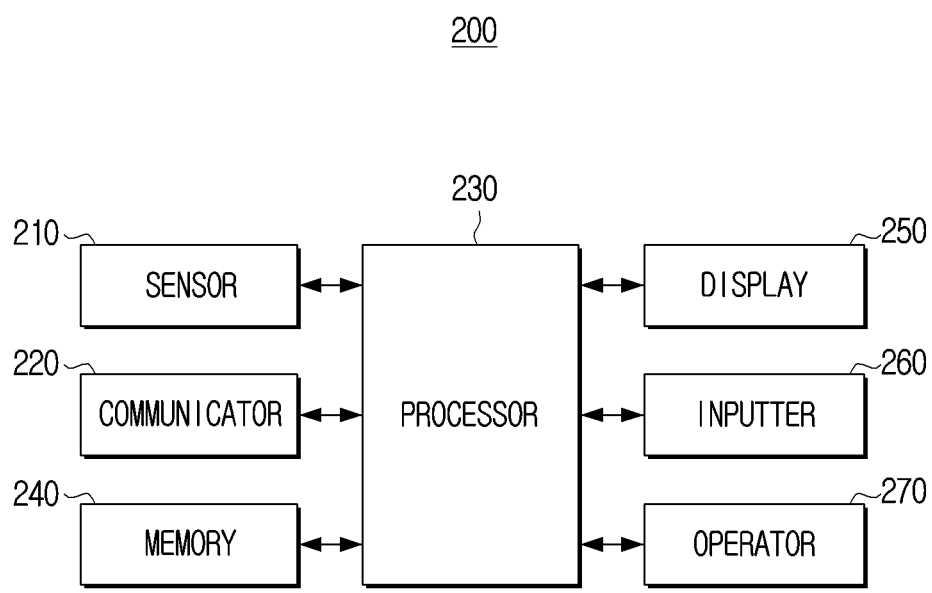
FIG. 9 is a block diagram illustrating a washing machine according to an embodiment of the disclosure.

FIG. 9 is a block diagram illustrating a washing machine according to an embodiment of the disclosure.

Referring to FIG. 9, the washing machine 200 according to an embodiment may include a sensor 210, a communicator 220, a memory 240, a display 250, an inputter 260, an operator 270, and a processor 230. Parts that overlap with the above-described descriptions will be abridged or omitted below.

The sensor 210 may be a configuration including a light-emitter and a light-receiver, and the light-emitter may be configured to irradiate light to the washing water, and the light-receiver may be configured to receive light transmitted to the washing water from among the light irradiated by the light-emitter.

The sensor 210 may be configured to output an electrical signal based on the amount of light received in the light-receiver. Specifically, the sensor 210 may be configured to output an electrical signal having different output values according to the amount of light received in the light-receiver. In an example, based on the turbidity of the washing water being low, the amount of light received by the light-receiver may be relatively great when compared with when the turbidity of the washing water is high. Accordingly, the output value of the electrical signal which is output by the sensor 210 based on the turbidity of the washing water being low may be greater than the output value of the electrical signal which is output by the sensor 210 based on turbidity of the washing water being high.

The sensor 210 may be configured to irradiate light to the washing water at the pre-set time intervals, and output an electrical signal based on the amount of light irradiated to the light-receiver. The pre-set time may be, for example, 2-minutes, but is not necessarily limited thereto.

Further, the turbidity information which includes the output value of the electrical signal output at the pre-set time intervals by the sensor 210 may be transmitted to the server 100 through the communicator 220.

The communicator 220 may be configured to transmit and receive various data by communicating with the server 100. To this end, the communicator 220 may include, for example, at least one of a wireless communication module or a Wi-Fi module. The wireless communication module may be configured to perform communication according to the various communication standards such as, for example, and without limitation, IEEE, 3rd Generation (3G), 3rd Generation Partnership Project (3GPP), Long Term Evolution (LTE), 5th Generation (5G), or the like, and the Wi-Fi module may be configured to perform communication with a Wi-Fi method. This is one embodiment, and the communicator 220 may be configured to perform communication with the server 100 through various communication links such as, for example, and without limitation, a short-range communication (LAN), a wide-range communication (WAN), or the like.

In addition, the communicator 220 may be configured to perform communication with the server 100 via an external device. In this case, the communicator 220 may be configured to be communicatively connected to the external device through a communication link such as, for example, and without limitation, Wi-Fi, Bluetooth, ZigBee, or the like, and transmit and receive various data by communicating with the server 100 through the external device. The external device herein is one example, and may be an access point (AP) which relays communication between the server 100 and the washing machine 200.

The memory 240 may be configured to store an operating system (OS) for controlling the overall operation of the elements of the washing machine 200 and instructions or data related to the elements of the washing machine 200.

Accordingly, the processor 230 may be configured to control a plurality of hardware or software elements of the washing machine 200 by using the various instructions, data, or the like stored in the memory 240, and load instructions or data received from the at least one of the other elements in a volatile memory and process the instructions or data, and store the various data in a non-volatile memory.

Specifically, the neural network model may be not only stored in the server 100, but also in the memory 240 of the washing machine 200. To this end, the washing machine 200 may be configured to receive the neural network model from the server 100 through the communicator 220, and the training of the neural network model may be performed by the washing machine 200 according to an embodiment.

The display 250 may display various images. The display 250 may be implemented as a liquid crystal display panel (LCD), an organic light emitting diode (OLED), or the like, and the display 250 may also be implemented as a flexible display according to an embodiment.

The display 250 may be configured to display the course set in the washing machine 200, the operation mode of the washing machine, information on the washing time, and the like in the washing machine 200. Specifically, the display 250 of the disclosure may be configured to display at least one of the information on the washing time, the amount of detergent put in, or the number of rinses which is controlled based on the turbidity pattern of the washing water.

Figure 10:
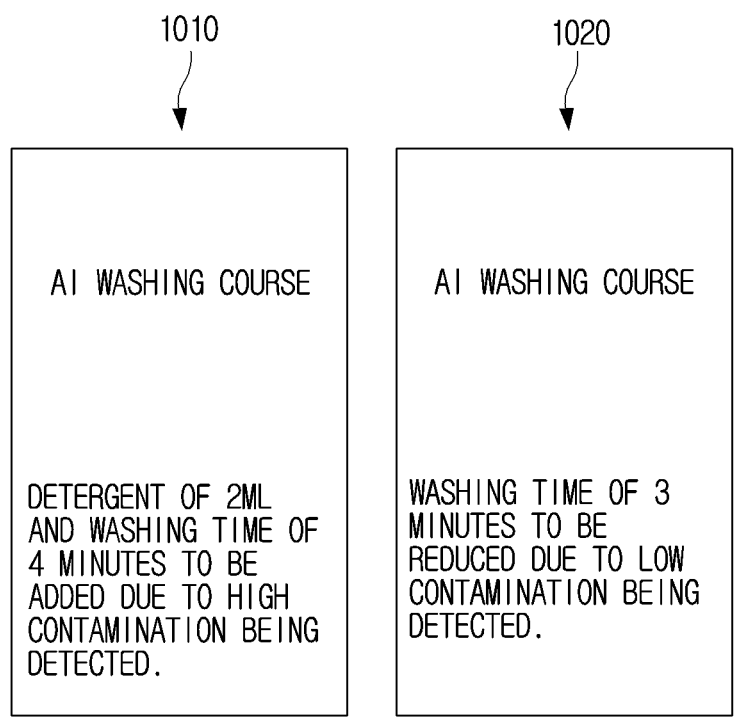
FIG. 10 is a diagram illustrating a screen which is displayed in a display of a washing machine according to an embodiment of the disclosure.

FIG. 10 is a diagram illustrating a screen which is displayed in a display of a washing machine according to an embodiment of the disclosure.

In an example, referring to FIG. 10, based on adding the amount of detergent put in and the washing time as the turbidity pattern of the washing water is identified as a descending pattern, the display 250 may be configured to display, for example, a message such as 'detergent of 2 ml, and washing time of 4-minutes to be added due to high contamination being detected' 1010. Alternatively, based on the washing time reducing according to the turbidity pattern of the washing water being identified as a rising pattern, the display 250 may be configured to display, for example, a message such as 'washing time of 3-minutes to be reduced due to low contamination being detected' 1020.

According to an embodiment, information or the like on the washing time, the amount of detergent put in, and the number of rinses which is controlled based on the turbidity pattern of the washing water may be displayed in a display of a user terminal device which communicates with the washing machine 200. To this end, the processor 230 may be configured to transmit information or the like on the washing time, the amount of detergent put in, and the number of rinses identified based on the turbidity pattern of the washing water to the user terminal device through the communicator 220.

The inputter 260 may be configured to receive various user commands. For example, the inputter 260 may be implemented in a button form, or the like on the main body of the washing machine 200, and may be configured to receive a user input such as, for example, and without limitation, turning-on or turning-off power, starting or ending of the washing cycle, or the like.

The operator 270 may be configured to control a driving of a load on a motor (not shown), a heater (not shown), a pump (not shown), or the like. Specifically, the operator 270 may be configured to drive the motor (not shown) based on the washing cycle instruction being received, drive the heater (not shown) based on a spin-dry instruction being received, and drive the pump (not shown) based on a rinse instruction being received.

The processor 230 may be configured to control the overall operation of the washing machine 200. The processor 230 may be implemented as at least one of an application specific integrated circuit (ASIC), an embedded processor, a microprocessor, a hardware control logic, or a digital signal processor (DSP). The term processor 230 used herein may be used as a meaning which includes a central processing unit (CPU), a graphics processing unit (GPU), a main processing unit (MPU), or the like.

The processor 230 may be configured to control the sensor 210 to obtain the turbidity information of the washing water at the pre-set time intervals, and control the communicator 220 to transmit the turbidity information of the washing water obtained through the sensor 210 to the server 100.

The processor 230 may be configured to control, based on the user input which is input through the inputter 260, the operator 270 to perform the washing cycle (e.g., washing, putting in detergent, spin-drying, rinsing, etc.) of the washing machine 200.

The processor 230 may be configured to adjust, based on the control signal for controlling the washing cycle being received from the server 100 through the communicator 220, at least one of the washing time, the amount of detergent put in, or the number of rinses according the control signal.

The methods according to one or more embodiments of the disclosure described above may be implemented with only a software/hardware upgrade on an electronic device according to the related art.

Further, the control method of the server 210 according to the one or more embodiments described above or the control method of the washing machine 200 may be implemented using a program and stored in a variety of storage mediums. That is, a computer program which is processed by various processors and capable of executing the one or more control methods described above may be used in a state stored in the recordable medium.

The non-transitory computer readable medium may refer to a medium that stores data semi-permanently rather than storing data for a very short time, such as a register, a cache, a memory, or the like, and is readable by a device. Specifically, the above-described various applications or programs may be provided stored in the non-transitory computer readable medium such as, for example, and without limitation, a compact disc (CD), a digital versatile disc (DVD), a hard disk, a Blu-ray disc, a universal serial bus (USB), a memory card, a read only memory (ROM), and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A washing machine comprising:
   a tub;
   a sensor positioned within the tub and configured to measure a washing water turbidity;
   a communicator; and
   a processor configured to:
   control the communicator to transmit first turbidity information of washing water measured at first pre-set time intervals by the sensor to a server, wherein the first turbidity information includes a first turbidity measurement for each of the first pre-set time intervals,
   receive a first control signal for controlling a washing cycle based on predicted turbidity information of washing water at a second pre-set time interval, the predicted turbidity information predicted based on the first turbidity information and on weather information,
   obtain, from the sensor, a second turbidity measurement at the second pre-set time interval,
   control the communicator to transmit second turbidity information of washing water including the second turbidity measurement to the server,
   receive a second control signal for controlling the washing cycle based on an amount of change between the predicted turbidity information and the second turbidity information from the server through the communicator, and
   control the washing cycle based on the second control signal.

2. The washing machine of claim 1, wherein the processor is further configured to control, based on the second control signal, at least one of a washing time, an amount of detergent put in, or a number of rinses.

3. The washing machine of claim 2,
   wherein, based on a turbidity pattern of the washing water being a rising pattern where turbidity information of washing water increases over time, the second control signal comprises a signal for reducing at least one of the washing time, the amount of detergent put in, or the number of rinses, and
   wherein, based on the turbidity pattern of the washing water being a descending pattern where turbidity information of washing water decreases over time, the second control signal comprises a signal for increasing at least one of the washing time, the amount of detergent put in, or the number of rinses.

4. The washing machine of claim 3,
   wherein, based on the turbidity pattern of the washing water being the rising pattern, and a difference between a most recent turbidity information of the washing water and the predicted turbidity information of the washing water being greater than or equal to a first threshold value, the second control signal comprises at least one of a signal for reducing the washing time by a first time, a signal for reducing the amount of detergent put in by a first quantity, or a signal for reducing the number of rinses by a first number of times, and
   wherein, based on the turbidity pattern of the washing water being the rising pattern, and the difference between the most recent turbidity information of the washing water and the predicted turbidity information of the washing water being greater than or equal to a second threshold value which is higher than the first threshold value, the second control signal comprises at least one of a signal for reducing the washing time by a second time which is longer than the first time, a signal for reducing the amount of detergent put in by a second quantity which is greater than the first quantity, or a signal for reducing the number of rinses by a second number of times which is greater than the first number of times.

5. The washing machine of claim 3,
   wherein, based on the turbidity pattern of the washing water being the descending pattern, and a difference between a most recent turbidity information of the washing water and the predicted turbidity information of the washing water being greater than or equal to a third threshold value, the second control signal comprises at least one of a signal for increasing the washing time by a third time, a signal for increasing the amount of detergent put in by a third quantity, or a signal for increasing the number of rinses by a third number of times, and
   wherein, based on the turbidity pattern of the washing water being the descending pattern, and the difference between the most recent turbidity information of the washing water and the predicted turbidity information of the washing water being greater than or equal to a fourth threshold value which is higher than the third threshold value, the second control signal comprises at least one of a signal for increasing the washing time by a fourth time which is shorter than the third time, a signal for increasing the amount of detergent put in by a fourth quantity which is less than the third quantity, or a signal for increasing the number of rinses by a fourth number of times which is less than the third number of times.

6. The washing machine of claim 1,
   wherein
   first pre-set time intervals are within a defaulted time section, and
   wherein the predicted turbidity information is turbidity information of the washing water from the defaulted time section to after a pre-set time interval determined by identifying an amount of change in turbidity information of the washing water for the first pre-set time intervals for the defaulted time section.

7. The washing machine of claim 1,
   wherein the predicted turbidity information is predicted by a neural network model stored in the server,
   wherein the neural network model is a model configured to identify an amount of change in turbidity information of the washing water for the first pre-set time intervals using the turbidity information of the washing water generated by at least one washing machine at the first pre-set time intervals as input data, and wherein the neural network model is trained to predict the turbidity information of the washing water based on the amount of change in turbidity information of the washing water.

8. The washing machine of claim 1,
wherein the predicted turbidity information is predicted by a neural network model stored in the server,
wherein the neural network model is a model configured to identify the amount of change in turbidity information of the washing water for the first pre-set time intervals using washing information comprising turbidity information of the washing water generated by the at least one washing machine at the first pre-set time intervals, a washing course set in the at least one washing machine, a weight of a laundry, and a temperature of the washing water and weather information as input data, and
wherein the neural network model is trained to predict turbidity information of the washing water corresponding to the washing information based on the amount of change in turbidity information of the washing water.

* * * * *